United States Patent
Skibba

(10) Patent No.: US 7,101,076 B2
(45) Date of Patent: Sep. 5, 2006

(54) EXTRUDER

(75) Inventor: Olaf Skibba, Hannover (DE)

(73) Assignee: A-Z Formen-und Maschinenbau GmbH, (DE)

( * ) Notice: Subject to any disclaimer, the term of this patent is extended or adjusted under 35 U.S.C. 154(b) by 135 days.

(21) Appl. No.: 10/618,303

(22) Filed: Jul. 3, 2003

(65) Prior Publication Data

US 2004/0247727 A1  Dec. 9, 2004

(30) Foreign Application Priority Data

Jul. 4, 2002 (DE) ............................. 102 30 118

(51) Int. Cl.
  *B29B 7/42* (2006.01)
(52) U.S. Cl. ........................................ 366/79; 366/82
(58) Field of Classification Search ................. 366/79, 366/81, 82, 88, 89, 90, 80
  See application file for complete search history.

(56) References Cited

U.S. PATENT DOCUMENTS 4,408,887 A * 10/1983 Yamaoka ..................... 366/79
4,447,156 A * 5/1984 Csongor ...................... 366/82
4,749,279 A * 6/1988 Csongor ...................... 366/82
5,348,388 A * 9/1994 Geyer ......................... 366/82
5,370,456 A * 12/1994 Yamaoka ..................... 366/82
5,641,227 A * 6/1997 Geyer ......................... 366/82
5,694,833 A * 12/1997 Wenger ....................... 366/82

* cited by examiner

*Primary Examiner*—Tony G. Soohoo
(74) *Attorney, Agent, or Firm*—Robert W Becker & Associates; Robert W Becker

(57) ABSTRACT

An extruder is provided having a transfer region that, in an extruder sleeve, is provided with ribs between which extend flow channels. Disposed opposite the sleeve flow channels are flow channels formed in the extruder screw, and the sum of the cross-sections of the flow channels, when viewed in the direction of extrusion, is shifted toward the sleeve and then toward the screw. The ribs (20) of the extrusion sleeve (12) at the ridges facing the screw (14) have a width that is at least one third, especially at least one half, and preferably approximately 80 to 100% of the width of the flow channels (22). Provided between the ridges of the ribs (20) of the extruder sleeve (12) and of the screw (14) is a gap (24) of more than 0.5%, in particular of about one percent of the diameter of the screw (14).

20 Claims, 2 Drawing Sheets

EXTRUDER

BACKGROUND OF THE INVENTION

The invention relates to an extruder having a transfer region which, in an extruder sleeve, has ribs between which extend flow channels, whereby opposite the sleeve flow channels, flow channels are formed in the extruder screw, and whereby the sum of the cross-sections of the flows channels, when viewed in the direction of extrusion, shift toward the sleeve and then toward the screw.

Such an extruder is known, for example, from AT-E-40073B. It has a transfer region in which the material that is to be extruded is pressed out of the region of the extruder screw into threads provided in the extruder sleeve. By the transfer from the extruder screw into the region of the extruder sleeve, and back, the mixing of the starting materials is to be improved, which represents an important qualify feature of the extruded material. To avoid losses, the cross-sectional areas of the flow channels are precisely coordinated, and the extruder screw runs exactly in the extruder sleeve, with the exception of the structurally required gap of, for example, 100 µm in conformity with the bearing play and the bending of the extruder screw during the rotation and stress.

It has also been proposed to change the flow cross-section in a defined manner in order to generate shear flows that are intended to improve the mixing. By reducing the cross-sectional surface there results, with rubber mixtures, which to this extent act like Newton's liquids, an elongated flow that corresponds to an acceleration of the mixture in an axially parallel direction of the extruder. However, this unfortunately results in a reduction of the retention time of the extruded material in the extruder. The discontinuous pitch in the screw lands of the transfer mixture region to this extent reduces the homogenization; the temperature behavior also becomes worse. The discontinuous pitch is therefore only well suited for rubber mixtures that are easy to process.

In contrast, it is an object of the invention to provide an extruder, the temperature distribution and homogenization capability of which are improved even with exacting mixtures such as natural rubber.

SUMMARY OF THE INVENTION

This object is inventively realized in that the ribs of the extrusion sleeve, at the ridge that faces the screw, have a width that is at least one third, in particular at least one half, and preferably approximately 80 to 100% of the width of the flow channels of the extruder sleeve, and in that there is provided between the ridges of the ribs of the extruder sleeve and the screw a gap of more than 0.5%, in particular of approximately one percent of the diameter of the screw. Advantageous further developments are provided in the dependent claims.

Pursuant to the invention, it is particularly expedient that, due to the provision of a transfer gap, a shear flow profile is produced that at the same length of the extruder offers a significantly improved homogenization. Due to the inventively induced elastic or shear flows, there is effected in a defined manner an improved thorough mixing, which makes the temperature level significantly comparable. Colder regions of the mixture can flow into the inventive width gap. The polymer chains that are present there are inclined to slide along one another and to thereby be heated in an efficient manner.

Pursuant to the invention, the retention time of the mixture in the extruder is clearly increased, whereby the length of the retention time can be controlled in a defined manner via the dimensioning of the inventive width gap.

In an advantageous embodiment of the invention, it is provided that the gap be provided with respective inlet or leading inclines that further improve the tendency of the material to flow in. The angle and the precise configuration of the inlet inclines can be adapted over a wide range to requirements.

Pursuant to the invention, the transfer is preferably effected using a linear characteristic. It is to be understood that instead of such a characteristic, it is also possible to select a characteristic that deviates from a linear course, for example a characteristic according to which the increase is negative in short regions, in other words, the flow cross-section of the flow channels of the extruder screw increases and in conformity therewith the flow cross-section of the flow channels of the extruder sleeve decreases.

Pursuant to the invention, it is particularly expedient that despite the same overall length of the extruder, the thorough mixing is considerably improved. This takes place with surprisingly simple means, whereby tests undertaken in conjunction with the invention have shown that the required power does not differ significantly from state of the art extruders. Due to the shear flow, plainly cold zones of the extruded material are also heated up, so that also with regard to the temperature a homogenization results.

BRIEF DESCRIPTION OF THE DRAWINGS

Further advantages, details and features can be seen from the following description of an embodiment with the aid of the drawings.

The drawings show.

DESCRIPTION OF PREFERRED EMBODIMENTS

Figure 1:
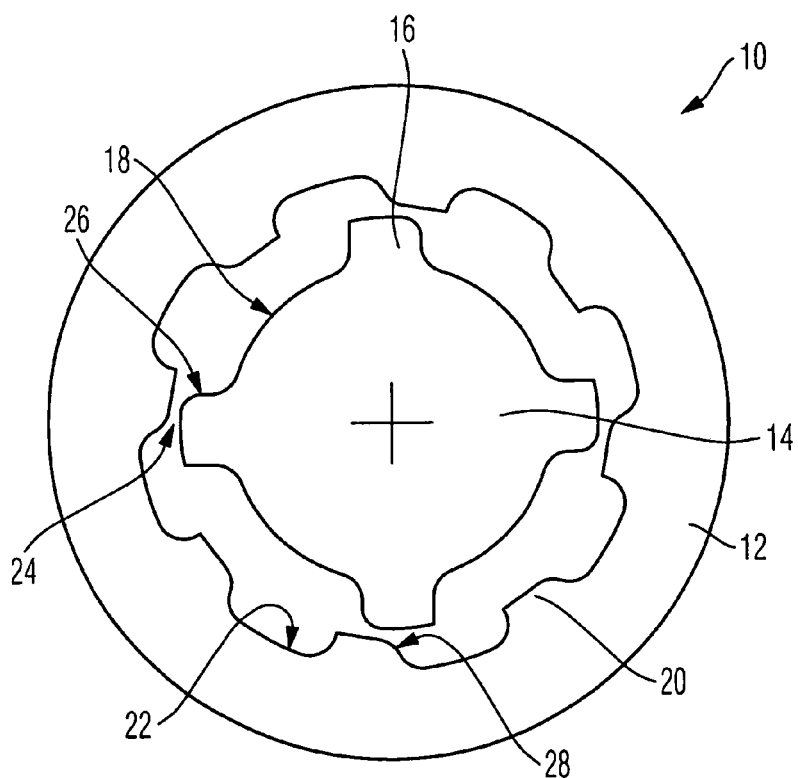
FIG. 1 an extruder in an inventive embodiment, namely in a schematic cross-sectional view approximately in the middle of the transfer region.

The extruder 10 illustrated in FIG. 1 has an extruder sleeve in which runs an extruder screw in a manner known per se. The cross-sectional view of FIG. 1 shows the transfer region. The extruder screw has ribs 16, between which extend flow channels 18. The extruder sleeve 12 also has ribs 20, between which extend flow channels 22. Pursuant to the invention, the width of the ribs 20 is increased, and in particular to a width that corresponds approximately to the width of the ribs 16 of the extruder worm or screw 14. In the illustrated embodiment, the width of the ridge is approximately half of the width of a flow channel 22.

Pursuant to the invention, there is furthermore formed between the ribs 16 and 20 a shear gap 24 that has a width of about 3% of the diameter of the screw. In combination with the lengthened or extended ridge width there thus results a shear gap 24 in which the extruded material is intensively and thoroughly mixed. It is to be understood that the width of the shear gap 24 can be adapted over a wide range to requirements. For example, the shear gap can also be 5% of the diameter of the extruder, or, for example, merely 0.8%. The precise configuration also depends upon the number of the worm lands of the screw 14, in other words, upon the number of the ribs 16 that are distributed about the periphery of the screw. In the illustrated embodiment, eight sleeve ribs 20 are combined with four screw ribs 16. It is to be understood that the configuration and arrangement are adaptable over a wide range to requirements.

Pursuant to the advantageous embodiment of the invention illustrated in FIG. 1, each rib 16 and 20 has a facet or incline 26 and 28, which in the illustrated embodiment is configured as a rounded portion. These inclines 26 and 28 significantly improve the flow of the extruded material into the shear gap 24, so that even cold areas of greater viscosity pass easily into the gap, where they are heated up by the shear and elastic flows that are generated.

Here too it is to be understood that the precise configuration of the inclines 26 and 28 is adaptable over a wide range to requirements.

Figure 2:
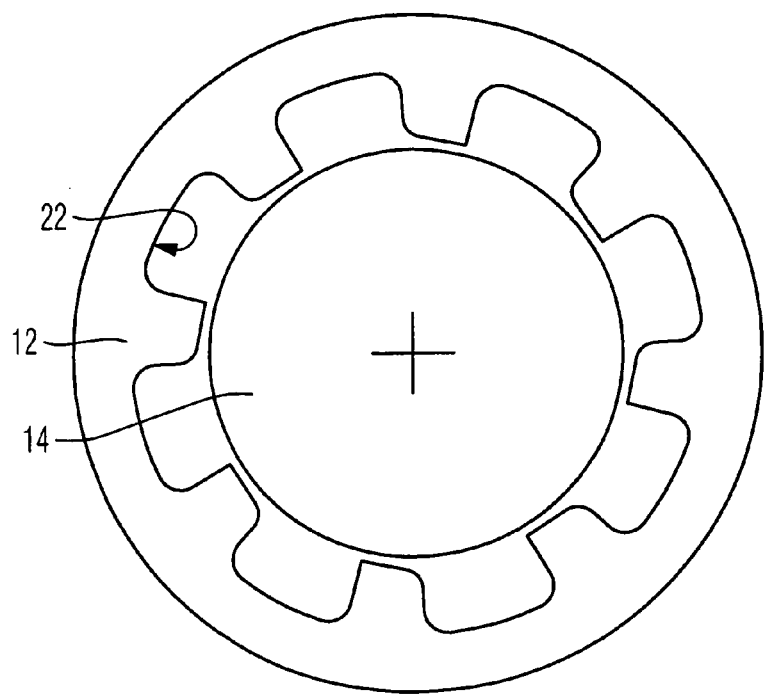
FIG. 2 the extruder in the embodiment of FIG. 1, in a cross-sectional view at the end of the transfer region.

FIG. 2 illustrates how the extruder sleeve 12 and the extruder screw 14 are represented at the end of the transfer region. The flow channels 22 have a flow cross-section that corresponds to the sum of the flow channels 18 and 22 of FIG. 1. At the end of the transfer region, the flow channels 18 are reduced to zero. Also at this location, an inventive shear gap 24 is provided that has the aforementioned effects.

Subsequent to the transfer region there extends, in a known manner, a further transfer region in which the depth of the flow channels 22 is reduced, and parallel thereto the cross-section of the flow channels 18 is increased until the flow channels 22 have disappeared.

Figure 3:
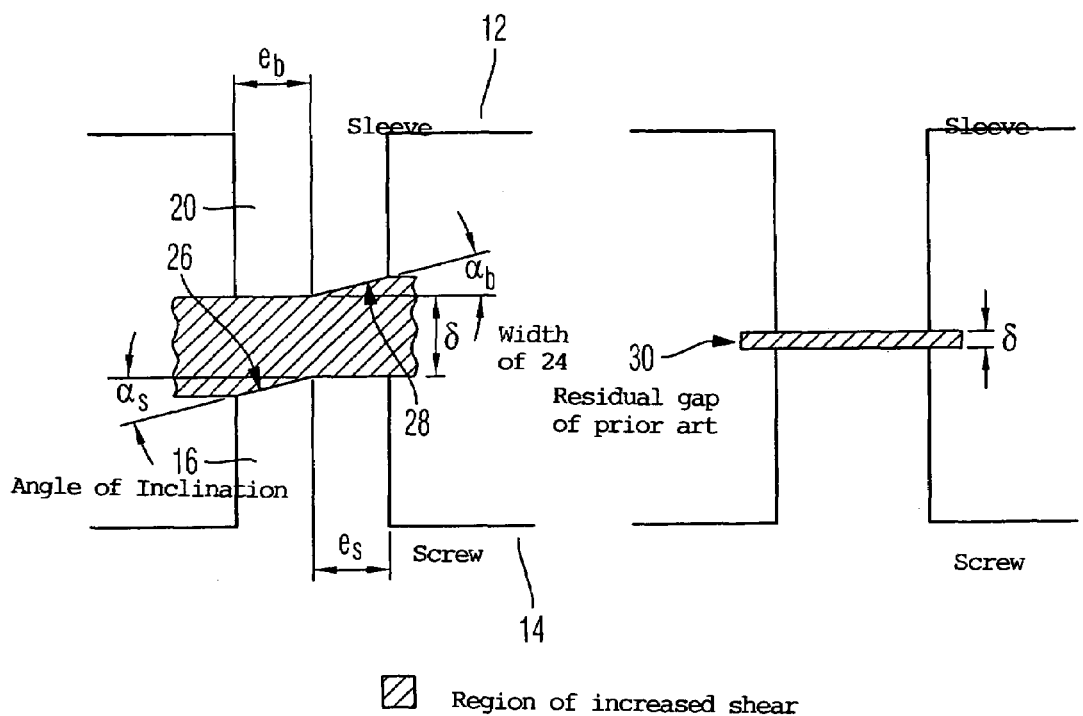
FIG. 3 a schematic illustration of an inventive shear gap in a different embodiment, in comparison to the state of the art.

FIG. 3 shows how an inventive shear gap 24 can be configured. With this embodiment, the inclines 26 and 28 are embodied as bevels. Their width is approximately half of the width of the ribs 16 and 20. In this embodiment, the angle of inclination $\alpha_s$, of the incline 26 is approximately 15°, and the angle of inclination $\alpha_b$ of the incline 28 is also 15°. The width of the shear gap 24 is approximately half of the height of each rib 16 and 20, or one fourth of the sum of the heights of the ribs 16 and 20, the heights of which, of course, continuously change throughout the transfer region, whereas the sum of the heights remains constant.

It is to be understood that instead of this width δ of the shear gap 24, a width of, for example, merely one tenth of the sums of the ribs could also be obtained.

The specification incorporates by reference the disclosure of German priority document 102 30 118.2 filed Jul. 4, 2002.

The present invention is, of course, in no way restricted to the specific disclosure of the specification and drawings, but also encompasses any modifications within the scope of the appended claims.

For the comparison of the structurally dictated residual gap 30, FIG. 3 also illustrates, at the right, how this gap results in extruders pursuant to the state of the art. It can be seen that the residual gap can have a height of, for example, 2.5% of the sum of the heights of the ribs. In contrast, pursuant to the invention the region of increased shear is increased in a significant and defined manner, resulting in the inventive effects.

The invention claimed is:

1. An extruder having a transfer region and comprising: an extruder sleeve that in said transfer region is provided with first ribs, wherein flow channels extend between said ribs, wherein said flow channels are U-shaped, wherein said U-shaped flow channels improve streaming behavior of material in the extruder sleeve; and an extruder screw disposed in said extruder sleeve and provided with second ribs between which extend flow channels that face said flow channels of said extruder sleeve, wherein said first ribs of said extruder sleeve have a ridge that faces said extruder screw, wherein said ridge has a width that corresponds to at least one third of a width of said flow channels of said extruder sleeve, wherein between ridges of said second ribs of said extruder screw and said ridges of said first ribs of said extruder sleeve a gap is formed that corresponds to greater than 0.5% of a diameter of said extruder screw, and wherein a thickness of the first ribs of the extruder sleeve is approximately a thickness of the second ribs of the extruder screw, wherein a sum of cross-sections of the flow channels shift toward the sleeve and then toward the extruder screw when viewed in a direction of extrusion, and wherein a width of the gap is approximately half a height of each said first and second ribs and, wherein the heights of said first and second ribs continuously change throughout the transfer region, whereas a sum of the heights remains constant.

2. An extruder according to claim 1, wherein said ridges of said first ribs of said extruder sleeve respectively have a width of at least one half of said width of said flow channels of said extruder sleeve.

3. An extruder according to claim 1, wherein said ridges of said first ribs of said extruder sleeve respectively have a width of approximately 80 to 100% of said width of said flow channels of said extruder sleeve.

4. An extruder according to claim 1, wherein said gap corresponds to approximately one percent of the diameter of said extruder screw.

5. An extruder according to claim 1, wherein said gap has a width that corresponds to at least one of: at least two percent of the diameter of the extruder screw and at least 15% of the sum of heights of said first and second ribs.

6. An extruder according to claim 1, wherein each of said ridges of said extruder sleeve and said extruder screw is provided with an incline in which said gap is increased to at least 3% of the diameter of the extruder screw, and wherein a normal of said ridges is inclined relative to a direction of rotation of said extruder screw.

7. An extruder according to claim 6, wherein said gap is increased to more than 5% of the diameter of said extruder screw.

8. An extruder according to claim 6, wherein an incline of said ridge of said first ribs of said extruder sleeve is a portion of the width of said ridge.

9. An extruder according to claim 8, wherein said incline is slightly more than one half of the width of said ridge.

10. An extruder according to claim 8, wherein said incline is a forward three fifths of the width of said ridge when viewed in a direction of rotation of said extruder screw.

11. An extruder according to claim 8, wherein the ridges of said second ribs of said extruder screw are also provided with an incline.

12. An extruder according to claim 11, wherein said incline of said ridges of said second ribs is provided at a forward edge as viewed in a direction of rotation of said extruder screw.

13. An extruder according to claim 1, wherein the ridges of said ribs of at least one of said extruder screw and said extruder sleeve are provided with a rounded portion or a bevel at a forward edge as viewed in a direction of rotation of said extruder screw.

14. An extruder according to claim 1, wherein said gap is at least 0.5% in only a portion of said transfer region, and in a remainder of said transfer region is approximately 1% of the diameter of said extruder screw.

15. An extruder according to claim 1, wherein said gap between said extruder screw and said extruder sleeve is a shear gap in which material that is to be extruded is subjected to elastic flows or shear flows.

16. An extruder comprising:
an extruder sleeve provided with first ribs, wherein flow channels extend between said ribs, wherein said flow channels are U-shaped, wherein said U-shaped flow channels improve streaming behavior of material in the extruder sleeve; and
an extruder screw that runs in said extruder sleeve-and is provided with second ribs, wherein flow channels extend between said second ribs, wherein said first and second ribs have respective ridges having a width that corresponds to approximately one third of a width of said flow channels of said extruder screw, wherein a gap of at least 1 mm is provided between said extruder sleeve and said extruder screw, and wherein a thickness of the first ribs of the extruder sleeve is approximately the same as to a thickness of the second ribs of the extruder screw, wherein a sum of cross-sections of the flow channels shift toward the sleeve and then toward the extruder screw when viewed in a direction of extrusion, and wherein a width of the gap is approximately half a height of each said first and second ribs, wherein the heights of said first and second ribs continuously change throughout the transfer region, whereas a sum of the heights remains constant.

17. An extruder according to claim 16, wherein said ridges of said ribs have a width that corresponds to approximately one half of the width of said flow channels of said extruder screw.

18. An extruder according to claim 16, wherein said ridges of said ribs have a width that corresponds to approximately 80 to 120% of the width of said flow channels of said extruder screw.

19. An extruder according to claim 16, wherein said gap is between 1.5 and 3 mm.

20. An extruder according to claim 16, wherein said gap between said extruder screw and said extruder sleeve is a shear gap in which material that is to be extruded is subjected to elastic flows or shear flows.

* * * * *